United States Patent [19]

Rao et al.

[11] Patent Number: 5,033,365
[45] Date of Patent: Jul. 23, 1991

[54] APPARATUS FOR SIMULATING OPEN FLAME BROILED MEAT PRODUCTS

[75] Inventors: Mohan Rao; Michael E. Harlamert; Dennis Ash; Sylvia L. Schonauer; Gregory D. MacGeorge; Keith D. Barkhau; John D. Beltz, all of Louisville; Donald R. Kupski, La Grange, all of Ky.

[73] Assignee: KFC Corporation, Louisville, Ky.

[21] Appl. No.: 547,627

[22] Filed: Jul. 2, 1990

Related U.S. Application Data

[63] Continuation-in-part of Ser. No. 377,177, Jul. 10, 1989.

[51] Int. Cl.$^5$ .................. A47J 37/00; A47J 37/06
[52] U.S. Cl. ........................ 99/349; 99/388; 99/400; 99/425; 99/445; 99/446
[58] Field of Search ............... 99/349, 352, 373, 386, 99/388, 391, 393, 400, 425, 427, 430, 441, 444–446, 443 CX; 101/31, 40; 426/383, 520; 219/400

[56] References Cited

U.S. PATENT DOCUMENTS

| | | | |
|---|---|---|---|
| 2,243,137 | 5/1941 | Vaughan | 99/441 |
| 2,483,669 | 10/1949 | Reid | 99/388 |
| 2,895,406 | 7/1959 | Randolph | 99/349 |
| 4,026,201 | 5/1977 | Fetzer | 99/355 |
| 4,186,217 | 1/1980 | Tchack | 99/446 |
| 4,290,349 | 9/1981 | Fiorenza | 99/339 |
| 4,297,942 | 11/1981 | Benson et al. | 99/443 C |
| 4,373,431 | 2/1983 | Wallick et al. | 99/483 |
| 4,433,621 | 2/1984 | Van Wyk et al. | 101/11 |
| 4,656,927 | 4/1987 | Mosby et al. | 99/402 |

Primary Examiner—Timothy F. Simone
Attorney, Agent, or Firm—Scully, Scott, Murphy & Presser

[57] ABSTRACT

The specification discloses an apparatus for rapidly cooking meat products for a quick service restaurant which will simulate the appearance of an open flame broiled meat product. The meat product is clamped between a grill and a series of raised crown portions formed in a cooking pan. The cooking pan also includes rounded depressions which alternate with the upraised crowns to serve as reservoirs for the collection of fat and other rendered meat juices. The clamping action between the grill and the pan compresses the meat product having a range of product weight to a uniform thickness while simultaneously assuring conductive heat transfer from the crowns to the meat and radiant heat from the black body pan to the meat. The grill is pre-coated with a carmelizing agent which leaves grill marks on the meat product during the cooking cycle. The grill, meat product and pan are loaded into a convection oven having means for creating heated high velocity convecting air which contacts the meat product, displace a food product boundary layer of cool air, and evenly heat the irregular surface of the meat product as heated air passes over it.

12 Claims, 7 Drawing Sheets

APPARATUS FOR SIMULATING OPEN FLAME BROILED MEAT PRODUCTS

CROSS REFERENCE TO RELATED APPLICATIONS

This is a continuation-in-part of U.S. Ser. No. 377,177 filed July 10, 1989 entitled Method and Apparatus for Simulating Open Flame Broiled Meat Products.

FIELD OF THE INVENTION

The present invention is intended for use in quick service restaurants to automatically and uniformly cook meat products in a manner which will simulate the appearance and texture of meat products that are individually broiled over an open flame.

BACKGROUND OF THE INVENTION

Open flame broiled cooking is highly desirable for meat products sold for public consumption, and such products have won wide customer acceptance based on their aesthetic appearance and taste to the palate.

Open flame cooking however requires constant and full time attention by a cook, and frequently results in meat products that are overdone in the thinner portions, and underdone in thicker portions. While this can be regulated to some extent by the thickness of the cut in beef products, it is difficult, if not impossible to achieve when broiling chicken or other irregularly shaped pieces of meat for sale to consumers. In particular, it is difficult to achieve in quick service restaurants which depend for the patronage on a uniformly prepared product that will appear visually the same and taste palatively the same each time the customer returns to the restaurant. With manual open flame cooking, this is difficult to achieve due to the differences in preferences by individual cooks or chefs, and at times, the work load imposed on a chef at peak lunch and dinner hours.

Therefore, there is currently a need in quick service restaurants for a method and apparatus which will rapidly and uniformly prepare meat products, particularly poultry products for consumption, wherein the product appearance simulates the appearance of an open flame broiled meat product.

DESCRIPTION OF THE PRIOR ART

U.S. Pat. No. 3,707,145 to Anetsberger et al. discloses a convection oven capable of temperatures to produce pyrolysis therein. Structure includes a cooking compartment, an outer shell and a space therebetween for environmental air. Air is drawn by a fan to keep control mechanisms and the exterior of the oven cool.

U.S. Pat. No. 2,243,137, cited during the prosecution of parent application U.S. Ser. No. 377,177, discloses the use of fins to conduct heat to a meat product during cooking.

U.S. Pat. No. 4,297,942, cited during the prosecution of parent application U.S. Ser. No. 377,177, discloses the use of heated "branding rods" which mark the meat product while conveying the product through a radiant cooking zone.

U.S. Pat. No. 2,895,406, cited during the prosecution of parent application U.S. Ser. No. 377,177 discloses an apparatus to clamp bacon strips together in a vertical orientation, over a fat drainage trough to uniformly cook the bacon from both sides without turning same.

U.S Pat. No. 1,988,087 to Perone discloses an enclosed broiler, heated from below, which is best illustrated with respect to the present invention in FIGS. 4 and 5. A grill 15 is equipped with substantial upstanding ribs 16 which supports a meat product to be cooked 18, which is secured in place by means of a grill 20.

U.S. Pat. No. 4,375,184 discloses an apparatus for heating foods such as french fried potatoes which includes a pan 9 a high speed air heating source generated by a fan means 129, wherein the air passes through an open mesh grill 119 secured to the fan plenum.

U.S. Pat. Nos. 685,342, 144,945, and 3,019,721 all disclose devices for facilitating the cooking of meat in a broiler or oven which include a pan or plate for receiving the meat, and a grill which overlies the meat at the time the product is prepared. In addition, the '945 patent and the '721 patent both disclose reservoirs for accumulating fat and meat juices expressed from the meat product during cooking.

U.S. Pat. Nos. 1,772,171 and 1,903,324 both disclose devices which secure a product to be cooked between two grills which are clamped together, wherein the food product is heated from either side by radiant heat.

U.S. Pat. No. 3,427,955 discloses a broiler pan having a series of upstanding flat surfaces 18 for receiving a meat product 24 to be cooked.

U.S. Pat. Nos. 3,994,212 and 4,121,510 both disclose broiler pans having meat product support corrugations which extend transversely to the length of the pan.

SUMMARY OF THE INVENTION

The present invention provides a method and apparatus for rapidly and uniformly cooking meat products which simulates open flame broiling. The invention also provides for pyrolytic self cleaning of the oven. A light weight aluminum pan means having a series of elevated crowned portions for receiving and directly conducting heat from the pan to the meat product is used in combination with a grill means which is pre-coated with a browning agent to leave carmelized grill marks on the meat product as it is cooked. It is releasably secured to the pan and is effective to clamp the meat product between the grill and the pan to a predetermined thickness during cooking, to thereby aid in the uniformity of the cooking process. The pan, meat product and grill are placed in a high velocity air convection oven. Alternating with the crowned portions in the aluminum pan are indented reservoirs which serve to collect the fat and meat juices which are expressed by the meat product during cooking. This prevents the degradation of the texture, flavor and appearance of the meat product. During the time the poultry is positioned in the convection oven, high velocity convecting hot air sweeps over the irregular surface of a poultry meat product to be cooked to break down the boundary layer of air which normally surrounds the food product. This results in rapid heat transfer to the food product. The convecting air removes water from the surface of the food product faster than moisture can migrate from the center towards the surface thereby browning or searing the surface of the food product without causing undesirable drying of the interior portions of the product. The combination of the pan and the convection oven results in an improved product which is cooked in substantially less time than conventional cook ovens and which results in a uniform product appearance which simulates the appearance of a flame broiled meat product. While the invention is equally applicable to all meat products, it is particularly useful for the simulation of open flame broiled poultry or chicken food products due to the irregular shape nd configuration of these food products.

It is therefore an object of the present invention to provide a method and apparatus for uniformly and rapidly cooking a meat product unattended by a cook while simulating the appearance of an open flame broiled meat product. It is another object of the present invention to improve the consistency of both the visual appearance and the palatable taste of the food product from batch to batch as compared to manually tended open flame broiled poultry. It is another object of the present invention to provide an apparatus which may be unattended during use, except for loading and unloading the oven with pre-assembled pans of meat products. It is still another object of the present invention to significantly reduce the amount of labor involved in cooking poultry pieces by providing pre-assembled pans of chicken parts which may be stored in a refrigerated housing until immediately prior to cooking, thereby avoiding the time consuming step of individually placing and turning individual pieces of meat product on an open flame grill.

BRIEF DESCRIPTION OF THE DRAWINGS

FIG. 3a is a side view of the grill illustrated in FIG. 3 illustrating a portion thereof in cross-section.

FIG. 3b is a cross-section of the rods 25 illustrated in FIGS. 3 and 3a.

DETAILED DESCRIPTION OF THE PREFERRED EMBODIMENT

The present invention is for a method and apparatus for cooking meat products in a quick service restaurant, particularly irregularly shaped poultry meat products. The invention includes the use of conduction radiation and convection heating with rapidly moving heated air to cook irregularly shaped meat products, while simultaneously, safely removing expressed fat to preserve the texture and appearance of the meat product. Such air removes the cool air barrier around a meat product to effect more consistent and better cooking. Concurrently the invention utilizes a modified pan, which was disclosed in the parent application in its original form, to impact an open flame broiled appearance to the meat product.

In the parent application, U.S. Ser. No. 377,177, the entire disclosure of which is incorporated herein by reference thereto, the benefits of an air impingement oven in conjunction with a pan for producing a desirable meat product was disclosed. However, in extended use, the oven was difficult to clean. Vaporous fat quickly coats the inside of the oven, requiring high temperature steam or caustic cleaning, both of which are impractical in a quick service restaurant. As described in the present invention, an oven design which cleans itself by means of pyrolysis is preferred. Such an oven is substantially disclosed in U.S. Pat. No. 3,707,145 to Anetsberger, et al., the entire disclosure of which is incorporated herein by reference thereto.

In order for an oven to reach temperatures where pyrolysis takes place, it is necessary to seal off the cooking compartment. The oven of the parent application could not be sealed, and it was therefore not possible to use pyrolysis for cleaning. When the doors of the oven used in the present invention are closed, the oven is sealed and temperatures of pyrolysis may be produced. Another concern relative to production of such high temperatures is the external temperature of the oven relative to both the safety of personnel and the protection of control mechanisms for the oven. Therefore a space has been provided for the flow of cooler air from the environment between the cooking compartment and the outer cover for the oven. The passage of air in this compartment provides a "cool to the touch" feature for the outer cover of the oven and protects the control mechanisms from elevated temperatures.

The pan of the parent application has also been modified, to be used more effectively in conjunction with the present convection oven. The side walls of the pan have been altered, and the crown configuration has been altered to work more efficiently with a convection oven. FIGS. 1-8 illustrate the modified pan of the present invention.

As illustrated in FIGS. 1-8, the pan comprises a pan 11 which supports a meat product, such as a chicken drum stick, to be cooked. As will be hereinafter illustrated with respect to FIGS. 4 and 5, the pan has two series of elevated crowns 22, separated by a trough 29, for receiving and directly conducting heat from the pan to the meat product to be cooked. The crowned portions alternate with a plurality of reservoirs 23, which feed into trough 29, for collecting fat and juices expressed by the meat product during the cooking operation. A grill 13 overlies the meat product 12 and is releasably mounted to pan 11 by means of clamps 14, 15 which will be hereinafter further explained with respect to FIGS. 3, 6 and 7. The grill is removed from the pan during placement of the meat product, and when the pan is loaded for cooking, the grill is mounted to clamp the meat to a predetermined thickness between the crowns of the pan and the underside of the grill.

When the pan is in the convection oven the heated air sweeps both the surface of the meat product 12 to be cooked and the underside of the flats of the pan 11 to convect heat thereto, and thereby cook the meat product. In order to simulate the appearance of an open flame broiled product, it is necessary to brown or sear the surface of the meat product 12. Browning or searing cannot be accomplished on the surface of a moist food product as long as moisture migration and evaporation keep the surface damp and cooler than the searing temperature of the product. Rapid browning requires heating the product with the convecting hot air at approximately 350° F. while searing or grilling requires heating of the product surface to about 400° F. or higher. The convecting hot air moves about the inner compartment at velocities of 800-1100 feet per minute at a temperature of 400°-495° F. to sweep over the surface of the food product as the hot air is circulated through the oven. The preferred cooking temperature is 475°-495° F. The convecting air removes the boundary layer of air which surrounds a cool food product and results in a rapid heat transfer to the product. The water is removed from the surface of the product faster than moisture can migrate from the center of the product towards the surface. This results in browning or searing without causing undesirable drying of the interior portions of the product. In a normal oven, the temperature of the air heating the product can easily be more than twice the temperature of the boundary layer immediately adjacent to the product. Since the cool air is substantially denser than heated air, there is a significant lag in the transfer of heat to the product to be cooked. Radiant heat, while penetrating the boundary layer, requires relatively high temperature at the source of the radiation, which results in a substantially higher heat gradient between the surface of the food and the interior of the food. Thus as the surface browns from radiant heat, the brown and dried surface acts to inhibit further heat transfer to the interior of the food product. This forms an insulating layer which prevents the migration of moisture from within, while continuing to absorb heat and brown on the surface. For food products of relatively uniform cross-section, this temperature gradient can be adjusted to provide the desired cooking result in the meat product. However, for irregular food products such as drumsticks or chicken breast with wings, the smaller thinner portions of the meat product become overcooked by radiant cooking before the interior of the thicker portions of the product are properly cooked.

A convection oven however uses a source air temperature which is substantially lower than the source temperature of a radiant heat source. This results in a milder and more controlled browning or crisping of the surface, and a more controlled heat transfer to the interior of the product.

The present invention uses air convection heating, and conductive heating from the pan to cook the meat product. In addition, there is some radiation from the walls of the cooking oven and the pan which assists in cooking the meat product. The surface of the meat product is cooked by the convecting hot air, while the pan transmits additional heat directly to the food product through heat conduction.

Figure 1:
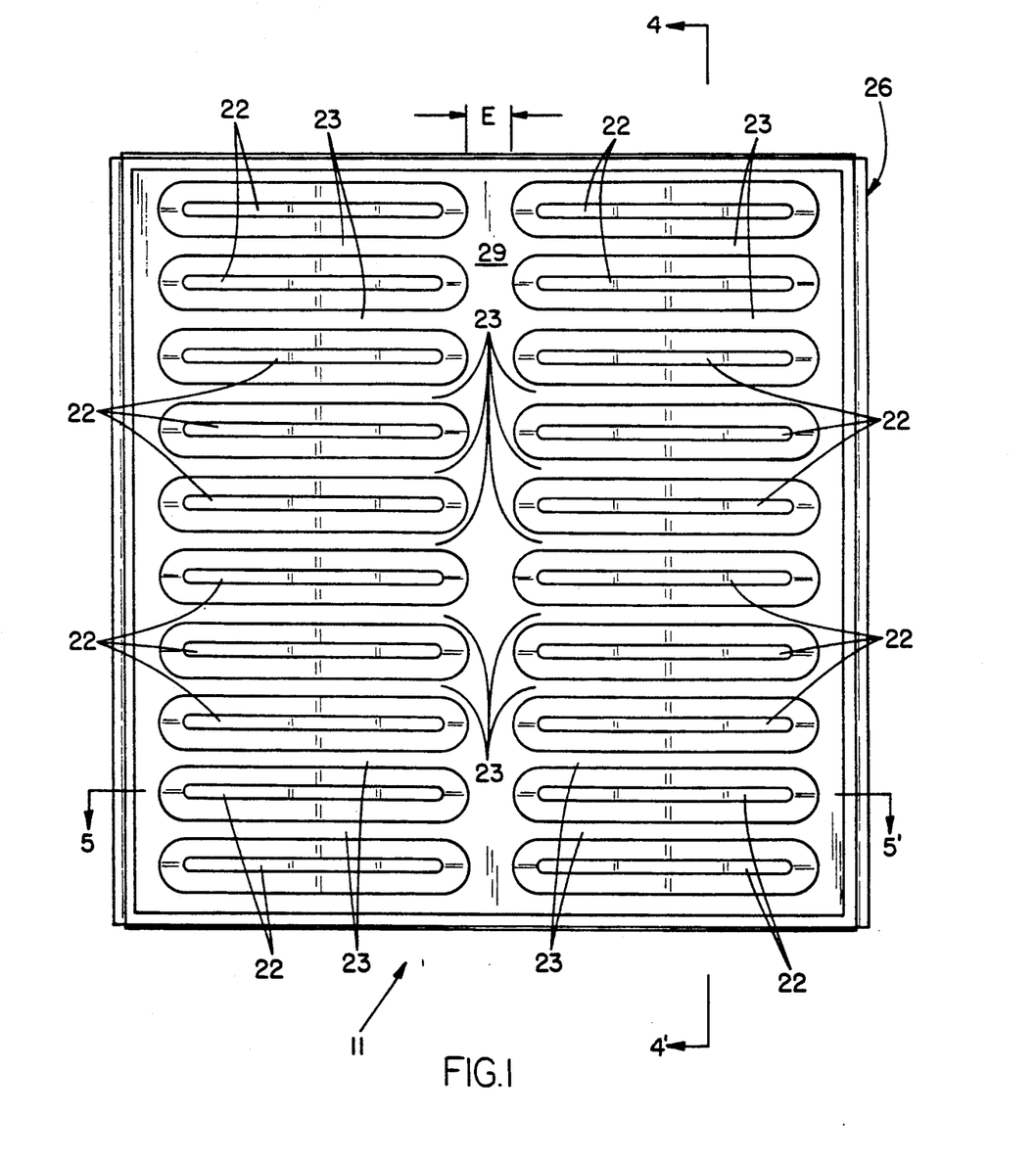
FIG. 1 is a top plan view of the pan of the present invention.
Figure 2:
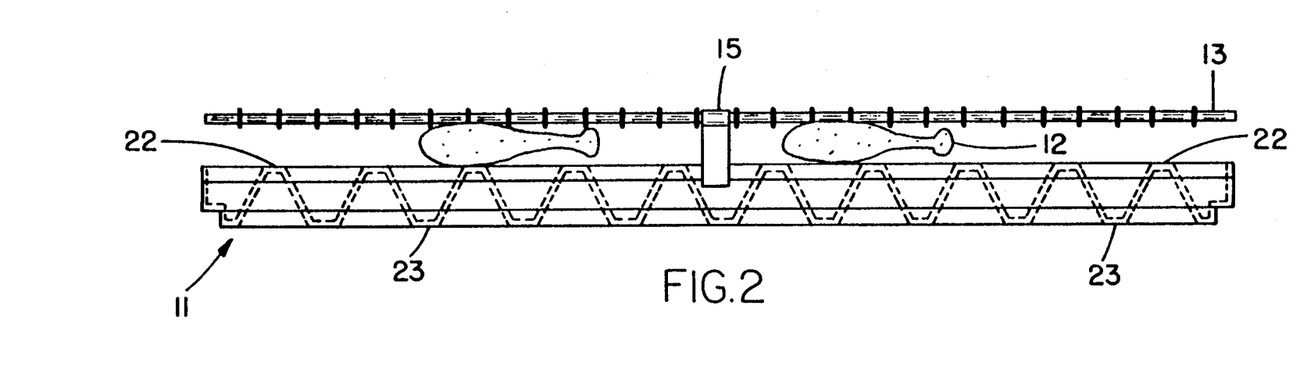
FIG. 2 is a side view of a pan of the present invention illustrating a grill, pan and meat products clamped therebetween.

As illustrated in FIG. 2, the meat product 12 is clamped between grill 13 and the crowns 22 of pan 11. The pan 11 is illustrated in side view with the interior of the pan shown by broken lines. Alternating between the crowns 22 of the pan are reservoirs 23 which collect fat and meat juices expressed or rendered from the meat product during the cooking operation. Because of the relatively high fat content of a meat product, it is not feasible to cook the meat product directly in a convection oven since the fat will collect on the bottom surface of the inner compartment and create both a health and a fire hazard.

Several alternate pan designs have been tested, some of which did not cook the meat uniformly and some of which had additional problems with rigidity, strength, the rate of heat transfer, or allowing the fat to come into contact with the food product during the cooking operation.

The final design of the pan provides significant contact portions 22 which permit direct conductive heat transfer into the food product to be cooked, with spaced alternating truncated V-shaped reservoirs 23 which collect the fat and juices expressed during the cooking thereof. In addition, the grill 13 is used to clamp the food product 12 to the flat crowned contact areas and thereby provide conductive heat transfer and a relatively uniform cross-section for more consistent internal cooking of the meat product. The clamping action of the grill deforms the meat product to be cooked, and urges it into contact along the upper portion of the crowns to maximize conductive heat transfer. The contour of the crowns enables the juices and fats to be more easily collected in the reservoirs 23. In one test between the pan design illustrated in FIGS. 4 and 5, and a conventional herringbone pan, a chicken meat product was cooked in each pan under the same conditions and the final product compared. The pan illustrated in FIGS. 4 and 5 produced an aesthetically pleasing product with piece internal temperatures of 190° to 210° F., and with the proper color and doneness. The herringbone pan design however, produced a product with internal temperatures of 165° F. to 190° F., which was not completely cooked, and was pale on the underside.

Figure 3:
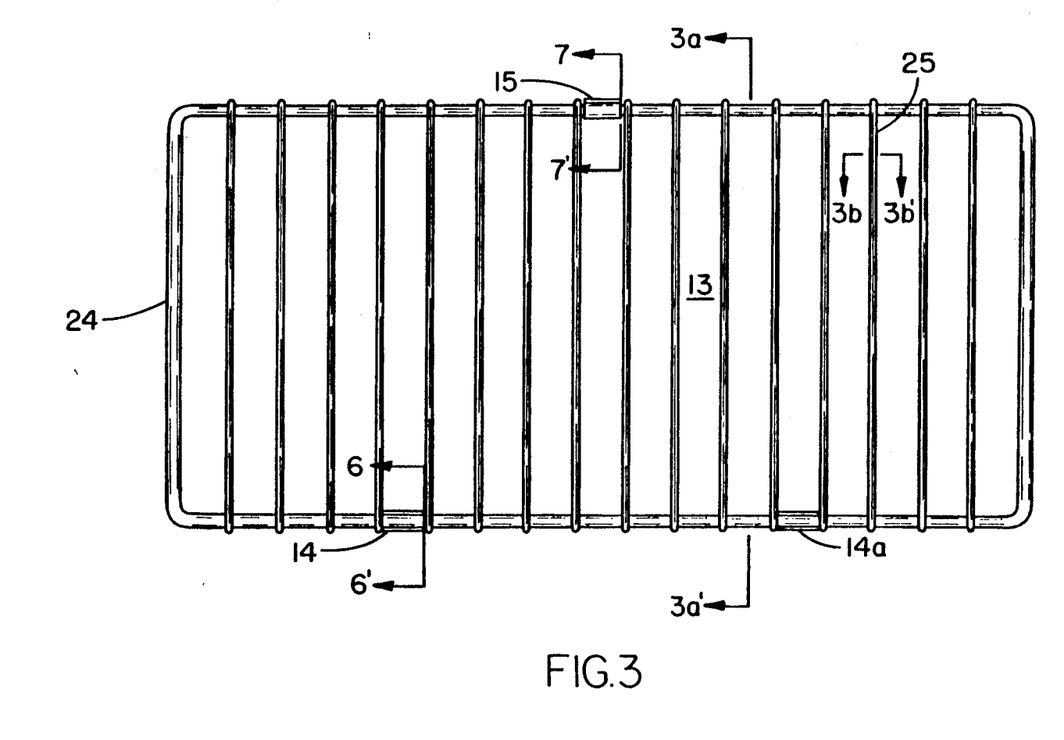
FIG. 3 is a top view of the grill of the present invention.
Figures 3A, 3B:
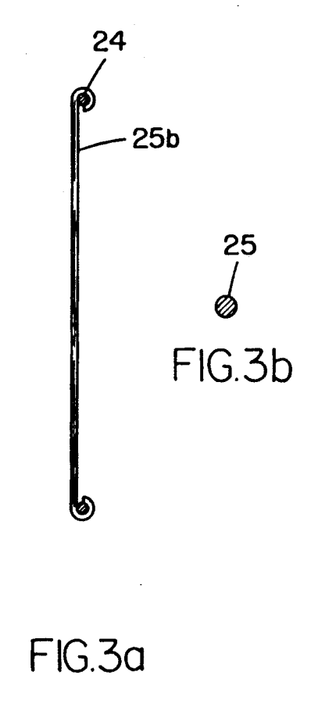

In addition to providing a uniform meat thickness, the grill means 13 also creates a method of generating simulated burn marks on the surface of the meat product which emulates those created by open flame grilling. The top rack is roughened on the underside as indicated at 25b in FIG. 3a and then coated with a browning agent which carmelizes during the cooking cycle leaving lines on the surface of the food product wherever the top rack has touched it. The carmelizing agent is dextrose which may be suspended in water or in cocoa butter for stick application. As illustrated in FIG. 3, the grill 13 is constructed of a round ¼ inch stainless steel perimeter rod 24 having a round cross-section as illustrated at 24a, and upon which is secured a series of quarter inch round cross-section stainless steel rods 25 as illustrated in cross-section in FIG. 3b. The round rods are secured by wrapping as illustrated in FIG. 3a, and may be further secured by welding if desired to eliminate grease entrapment cavities. The grill is clamped to the pan by means of clamp means 14, 14a and 15 which cooperate with a perimeter rib 26 formed on the exterior of pan 11.

Figure 8:
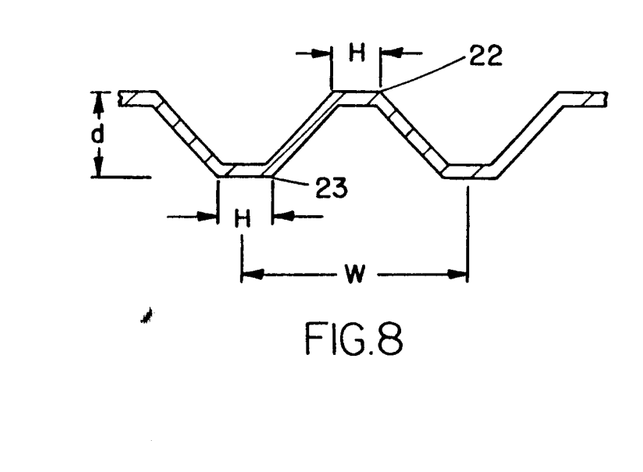
FIG. 8 is an enlarged diagrammatic view of the cross-section of the crowns and reservoirs formed in the pan illustrated in FIGS. 1, 4 and 5.

In the preferred embodiment of the present invention, pan 11 is formed from a single sheet of hardcoat anodized aluminum in a stamping operation which creates a series of angular corrugated reservoirs 23 having a width H at their flat bottom portions of approximately one-quarter inch as illustrated in FIG. 8 and a depth d of approximately one inch. The stamping process creates a series of crowns 22 as the metal is drawn to the upper most portion of the crowns 22. The side ribs 26 may be formed as illustrated in FIGS. The sides of the pan extend only to the level of the ribs and no higher such that convecting air is not inhibited in reaching the meat product. These ribs, together with the transverse orientation and spacing of the reservoirs 23 provide enhanced stability and rigidity for the pan as compared to conventional herringbone or corrugated design. In the preferred embodiment, the aluminum is then coated with a "non-stick" fluoropolymer coating, such as sprayed Dupont Supra ® to aid in the cleansing of the pan after each use.

Figure 6:
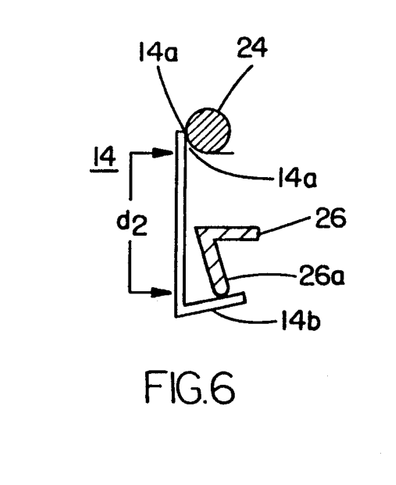
FIG. 6 is a side view of a fixed clamp means used to secure the grill to the pan.
Figure 7:
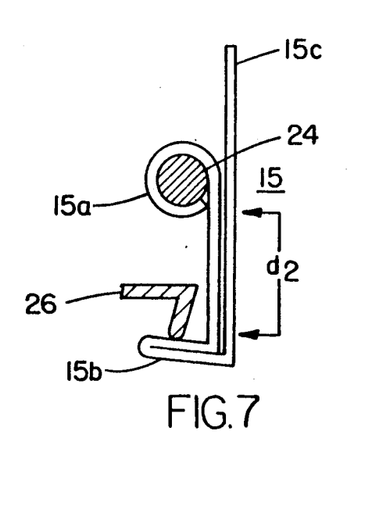
FIG. 7 is a side view of a releasable clamp means utilized in the present invention which is used to releasably secure the grill to the pan.

The grill is clamped to the pan by clamps that are illustrated in FIGS. 3, 6 and 7, wherein FIG. 6 illustrates the fixed clamps 14, 14a which secure the grill to one side of the pan, and FIG. 7 illustrates a moveable clamp 15 which is clamped to the opposing side wall rib 26 after the meat product has been loaded. By adjusting the effective clamp length $d_2$ as illustrated in FIGS. 6 and 7, the grill may be adapted to any desired thickness of meat product, and will secure and flatten the meat product against the crowns 22 of the cooking pan 11 when clamped thereto. In construction, the clamp illustrated in FIG. 6 is formed of a single bend of sheet stainless steel which is welded to the exterior perimeter rod 24 as indicated at 14a. The filling of the cavity with weld material also minimizes the amount of grease that can be trapped within the crevices. The single bend 14b extends inwardly and is secured against the lower most portion 26a of reinforcing rib 26. The dimension $d_2$ is varied, depending upon the thickness of the meat product to be cooked. If thicker pieces of meat are to be cooked, then $d_2$ will be greater. The grill does not contact the reinforcing ribs 26, or pan 11, except through clamps 14 and 15.

The releasable clamp 15 is formed of a single sheet which is multiply folded as illustrated in FIG. 7 to provide a hinged engagement with perimeter rod 24 by virtue of the curve formed in the clamp as illustrated at 15a. The doubled over portion 15b provides a clamp for securing the grill to the perimeter rib 26, while the upstanding single thickness 15c provides a thumb release for engaging and disengaging the clamp from the perimeter of rib 26.

Figure 4:
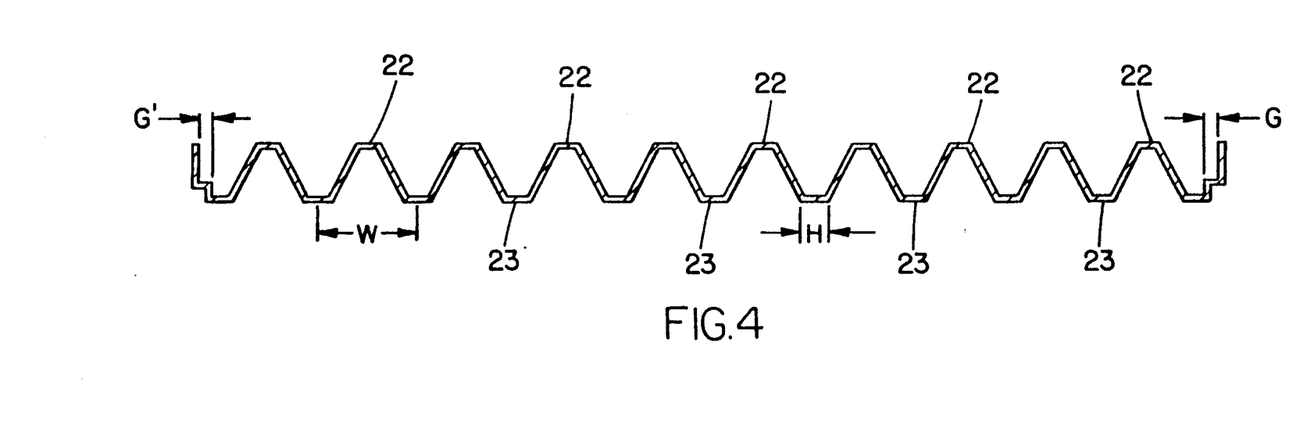
FIG. 4 is a cross-section view of the pan illustrated in FIG. 1 taken at section line 4,4'.
Figure 5:
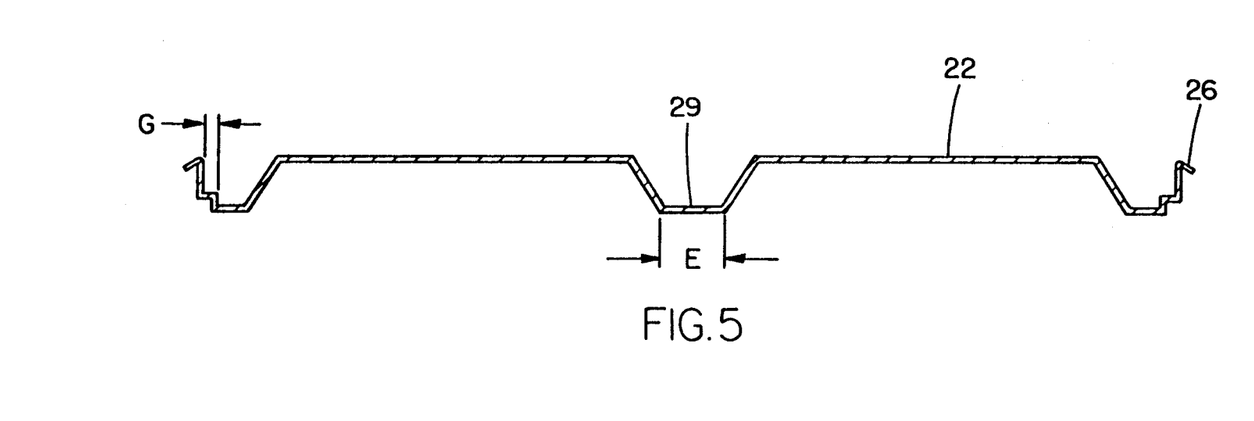
FIG. 5 is a cross-section view of the pan illustrated in FIG. 1 taken at section line 5,5'.

In the preferred embodiment of the invention the pan and grill are 17 inches long and 16½ inches wide with a pan depth of approximately one inch. As illustrated in FIGS. 4 and 5, the walls of the pan also stand one inch tall and are offset by ¼ inch as indicated at 6 from the bottom to the top of the wall. The two series of reservoirs 23 are divided by a trough 29 which is one inch wide as indicated at E in FIG. 5. Each of the reservoirs 23 and each of the crowns 22 has a flattened portion approximately ¼ in width, as illustrated at H FIG. 8. There is center line distance between the reservoirs of approximately 1⅜ inches, as indicated at W in FIG. 8.

Figure 9:
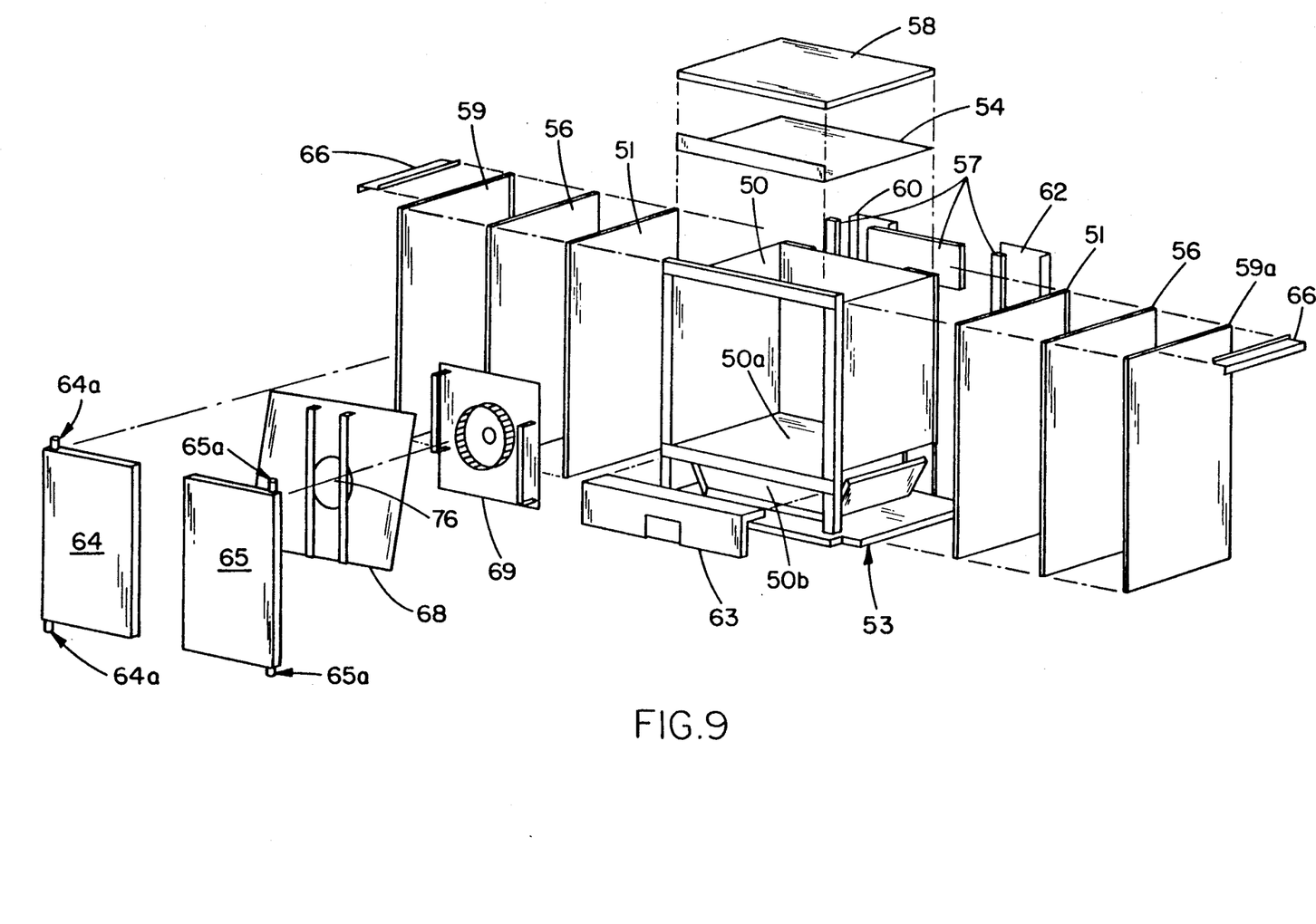
FIG. 9 is a exploded diagram of the inner assembly of the convection oven of the present invention.

As illustrated in FIG. 9, the convection oven of the present invention includes an inner cooking zone consisting of an inner housing assembly 50 which forms 4 sides of a cube, open on the front and bottom. A baffle 50a is attached by a plurality of latches to the inner housing 50 to form the bottom of the cube. A bottom pan 50b is arranged therebelow. Intermediate side walls 51, intermediate top wall 54, and base members 53, 50 are fixedly attached to the housing by welding. The remaining opening in the cube is the frontal access to the inner cooking zone.

Side insulation 56, rear insulation 57 and top insulation 58 are arranged around the intermediate walls of the inner cooking zone. The insulation serves both to retain heat inside the oven while also preventing the outside of the oven from becoming dangerously hot during pyrolysis. Right side and left side insulation covers 59 and 59a, and rear insulation covers 60 and 62 retain the insulation in it's desired location. The upper edges of the insulation layers 56 are protected by top edge insulation covers, as illustrated at 66.

FIG. 9 also illustrates a front insulation panel 63 and doors 64 and 65. The doors 64, 65 are mounted on pins 64a and 65a at their top ends and bottom ends, and attach to the oven to act as hinges so that the doors may be swung open. The doors may be either connected by cams such that upon opening one door the other will automatically open or they may be singly opened.

Figure 10:
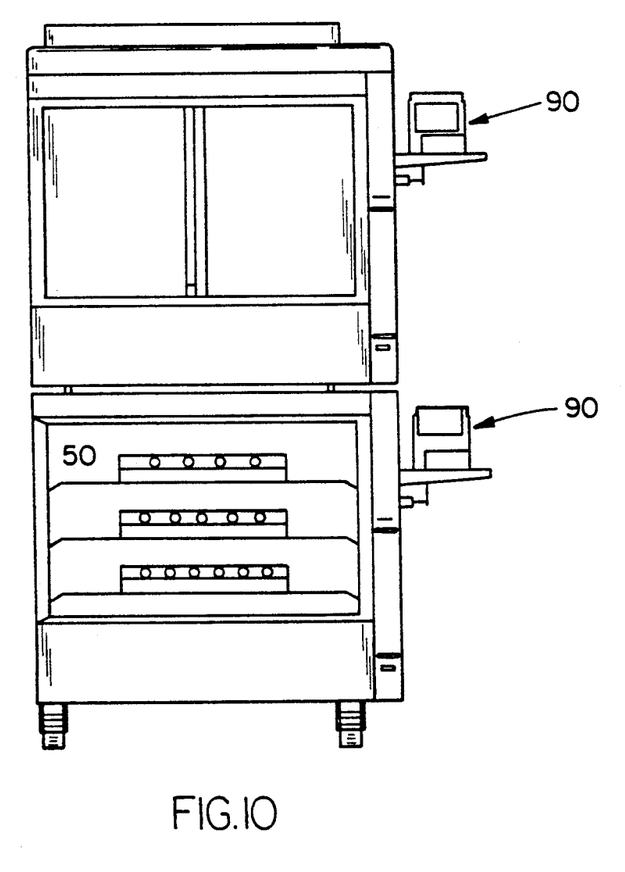
FIG. 10 is a front elevation of two stacked convention oven of the present invention illustrating the control module on the side thereof.
Figure 11:
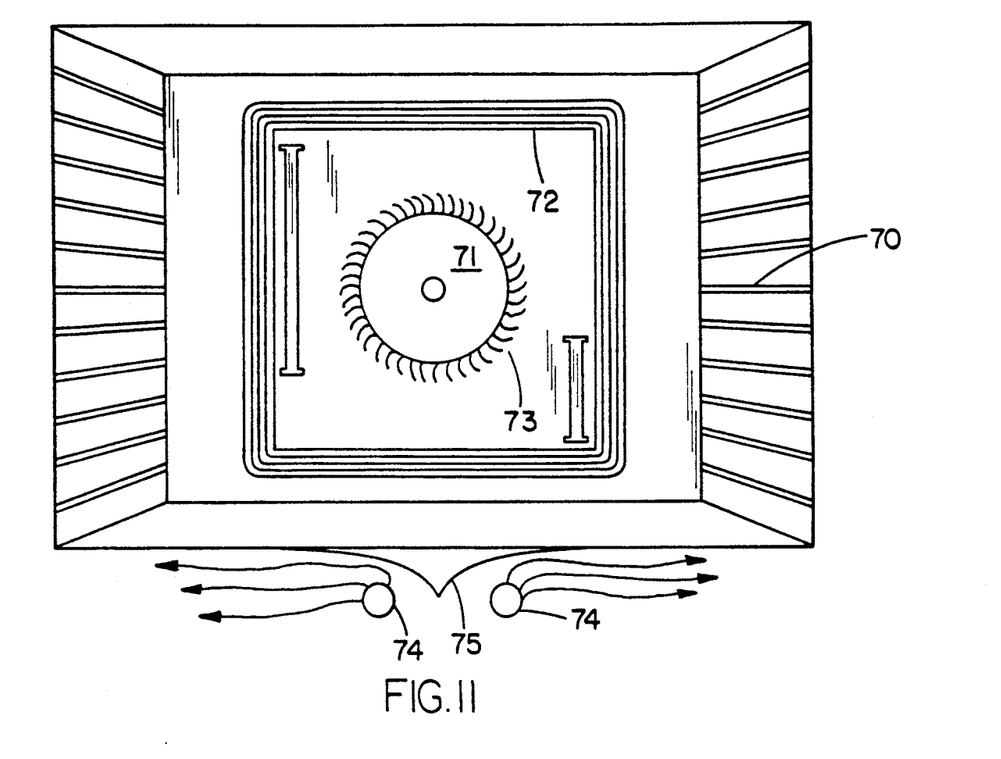
FIG. 11 is an interior view of the cooking compartment illustrating the fan means, heating elements and conventional rack support members.
Figure 12:
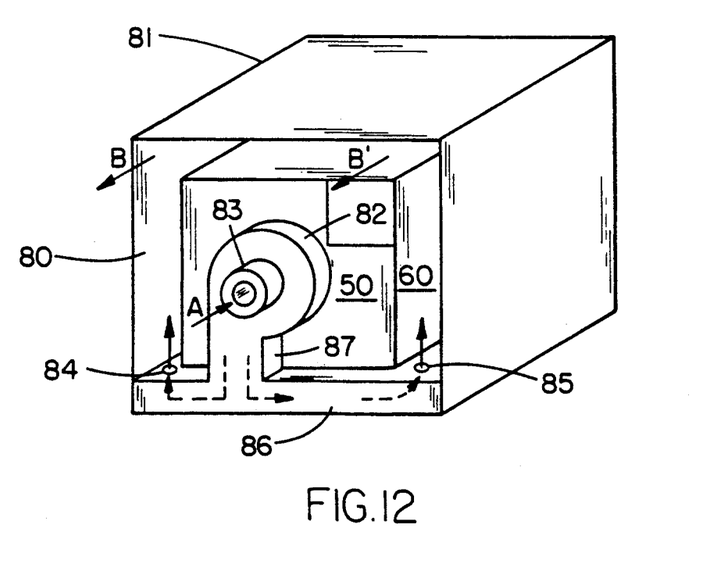
FIG. 12 is a diagrammatic view illustrating the cooling air passageway used in the convection oven of the present invention.

There is a further outer covering on the convection oven as illustrated in FIG. 10–12 which is spaced equidistantly from the insulation covers 59–62 to create an interconnecting cooling passageway in which ambient air is propelled by a cooling fan means. The cooling passageway thus reduces the temperature of the outside of the oven during both the cooking operation and during the pyrolytic self cleaning cycle.

FIG. 11 illustrates both the electric and gas embodiments of the oven of this invention. It is to be understood, however, that only one method of heating at a time is used in a given oven.

As illustrated in FIG. 11, arranged within the interior of the inner cooking zone are several rack supports 70 mounted in a conventional manner. These rack supports hold a number of pans of this invention during the cooking cycle. At the rear of the cooking zone are a fan means and heating means 72 (for an electric oven embodiment only) for creating heated high velocity convecting air. The cooking zone fan 71 is capable of withstanding temperatures of up to 538° C. (1000° F.) which provides a safety margin for use during the pyrolytic cleaning cycle to be discussed later. The fan itself is 24 cm in diameter, with 48 blades 73, each of which is 5 cm wide, with a forward curve design. The fan rotates clockwise at a speed of 1725 rpm with a 60 hertz power supply (at 50 hertz power the rotation speed is diminished to 1450 rpm). The fan is rotated by a 560 w or ¾ horsepower motor 83 illustrated from the rear in FIG. 12. Baffle 68, illustrated in FIG. 9, aids the fan in creating a uniform flow of air. The baffle 68 measures approximately 54 cm×60 cm, has a hole 76 in its center, and is mounted at the rear of the housing immediately in front of the fan. The baffle directs incoming air through the central aperture 76 to the fan from the cooking zone and directs the air flow from the fan outwardly and around the periphery of the baffle thus creating a uniform air flow pattern throughout the cooking area. The air flows in a cyclical pattern from the center of the oven into the fan means, past the heating means 72, out around the baffle along the periphery of the inner walls and back to the center of the oven. The airflow within the oven, over the racks of chicken, flows at 800 to 1100 fpm.

Further illustrated in FIG. 11 is an electric heating element 72 which provides the heat for both cooking of the meat product and for pyrolytic self cleaning. It is to be understood, however, that gas or LPG Liquid Propane Gas) burners can be substituted for the electric element. Where electric heating elements are used, there are preferably 6 calrod heating elements, each rated at 1.83 kw. The heating elements are disposed in rectangular configuration around the cooking zone fan, between the baffle and inner rear wall. The heating means is designed to maintain a near constant 232°–257° C. (450°–495° F.) temperature for cooking, but yet be capable of reaching 455°-482° C. (850°-900° F.) for the pyrolytic self cleaning cycle. Temperature within the cooking zone is monitored and maintained by a computer attached module 90 illustrated in FIG. 10.

Where gas is used as the source heat it is preferred to regulate the flow thereof to 8.64 cm (3.4 inch) water column pressure. The preferred nozzle is a No. 25 orifice mounted on two cast iron atmospheric burners 74 (illustrated in FIG. 11) which in combination with the regulated gas flow delivers 33.7 kw (125,000 BTU/hr) of heat. The burners are disposed below the bottom baffle 50a (shown in FIG. 9) of the inner cooking zone and the heat produced thereby is directed along the bottom of the housing by baffle 75 (illustrated in FIG. 11) and is channeled through at least one flue which is formed in close proximity with at least one of the inner walls of the inner cooking zone. The heat flowing therethrough is absorbed into the inner walls of the inner cooking zone and transmitted therethrough. The transmitted heat is then convected through the interior of the inner cooking zone by fan means 71.

During the pyrolytic (chemical decomposition from heat) self cleaning cycle the internal temperature of the oven reaches 455°-482° C. (850°-900° F.) and must remain at that temperature for 15-20 minutes. This puts a great deal of thermal stress on components such as the convection fan, motor and control mechanism. The construction described herein takes into account the high temperatures of pyrolysis and the detrimental effect it may have on the control, fan and motor necessary for the operation of the oven.

As illustrated in FIG. 12, there is an interconnected space 80 between the inner cooking zone within the inner housing 50 and the outer cover 81. Disposed in this space at the rear of the oven is a second fan 82 which is connected to the same motor 83 and drive shaft as the convection fan 71 within the cooking zone. The second fan operates to draw cooler air from the surrounding environment, as indicated by arrow A, through the fan 82 and into duct 87. Duct 87 connects with a lower plenum 86 which extends under the oven and connects with passageway 80 through a plurality of openings, two of which are illustrated at 84 and 85. The cooling air then circulates upwardly along the walls of the inner chamber and is then expelled to the surrounding environment at the top thereof as illustrated by the arrows B,B'. This transient air is utilized to protect the control mechanism and fan motor for the oven, and also functions to maintain a lower exterior temperature for the oven which prevents injury to personnel who may contact the outer wall 81 during the pyrolysis cycle. This air does not however effect internal temperatures due to the insulation next to the inner walls of the oven. As another safety feature, there is provided a safety lock, which will not allow the doors to be opened when the internal temperature is above 260°-288° C. This type of safety mechanism is known in the art.

As illustrated in FIG. 10, in the preferred method of the present invention, the pans are placed in the convection oven in the center of each shelf. This provides for better air flow and therefore better cooking of the product.

The combination of the pan configuration, the grill, pan placement and the convection oven creates a superior cooking apparatus which is able to significantly reduce the cook time required to cook a meat product, while simultaneously simulating the visual appearance and texture of an open flame broiled food product. The convection oven also enjoys the additional benefit of self cleaning by pyrolysis. Since the temperature and airflow of the convection oven are controlled by control means 80 illustrated in FIG. 10, the cooking is completely unattended, except for the loading and unloading of pans of food products from the support racks.

What is claimed is:

1. Apparatus for rapidly cooking meat products to simulate open flame broiling, said apparatus comprising;
   (a) pan means for supporting a meat product to be cooked, said pan means having a series of elevated crowns for receiving and directly conducting heat from the pan to the meat product to be cooked, said crowns alternating with a plurality of reservoirs for collecting fat and juices from said meat products,
   (b) grill means overlying said meat product, said grill means releasably mounted on said pan to enable placement of said meat products to be cooked between said grill and said pan, said grill means effective upon mounting to said pan means, to clamp the meat to a predetermined thickness between the crowns of said pan and an underside of said grill means,
   (c) a heating means, said means including a convection fan means to direct high velocity heated air across said pan, grill and meat product,
   (d) enclosure means for confining said high velocity heated air and supporting said pan and grill means.

2. An apparatus as claimed in claim 1 wherein said heating means further includes a control means having a first predetermined temperature for cooking a meat product and a second predetermined temperature for pyrolytic self cleaning of said apparatus.

3. An apparatus as claimed in claim 1 wherein said high velocity heated air circulates from a center area of said cooking zone through said convection fan means, along an inner wall of said enclosure means, and across said pan, grill and meat product to the center of the cooking zone.

4. An apparatus as claimed in claim 1 which further includes an outer enclosure to define an air passageway between said outer enclosure and said enclosure means to channel transient air therebetween.

5. An apparatus as claimed in claim 1 wherein the velocity of said high velocity heated air is between 800 and 1100 FPM.

6. An apparatus as claimed in claim 1 wherein the pan means is formed with reinforcing ribs on the outer perimeter thereof.

7. An apparatus as claimed in claim 6 wherein the grill further includes a plurality of clamps for releasably engaging said reinforcing ribs.

8. An apparatus as claimed in claim 1 wherein said pan is formed with alternating transverse crowns and reservoirs which simultaneously strengthen said pan while forming collection reservoirs for the collection of expressed fats and juices from said meat product.

9. An apparatus as claimed in claim 8 wherein said indentations are formed with a truncated triangular cross section.

10. An apparatus as claimed in claim 8 wherein said pan is formed of stamped aluminum.

11. An apparatus as claimed in claim 1 wherein said grill is coated with a carmelizing layer at the time said meat product is releasably clamped.

12. An apparatus as claimed in claim 8 wherein the pan means is formed of a dark colored fluoropolymer coated aluminum.

* * * * *